July 19, 1966     A. J. SIPIN     3,261,205

MASS FLOW METERING MEANS

Original Filed May 24, 1961

INVENTOR.

Anatole J. Sipin

United States Patent Office 3,261,205
Patented July 19, 1966

3,261,205
MASS FLOW METERING MEANS
Anatole J. Sipin, 117 E. 77th St., New York, N.Y.
Original application May 24, 1961, Ser. No. 112,393, now Patent No. 3,218,851, dated Nov. 23, 1965. Divided and this application May 13, 1965, Ser. No. 455,523
9 Claims. (Cl. 73—194)

This application is a division of my application S.N. 112,393, filed May 24, 1961 for Mass Flowmeter, now U.S. Patent No. 3,218,851.

This invention relates to a means for measuring the mass of matter flowing in a line such as liquids, gases and fluent solid material. The system requires no bends or revolving parts in the flow path.

There is widespread need for a means that measures mass flow with minimum resistance to the flow and without sliding surfaces in the flow path that could be attacked or could contaminate the flowing material, and that could provide undesirable leakage paths. In the chemical process industries, for example, it is frequently necessary to combine corrosive fluids in accurately maintained weight ratios. In aircraft flight refueling it is advantageous to measure the weight of fuel transferred at very high flow rates and very low pressure losses. In the food industry it is of major importance that the system be of such material and construction that the fluid cannot be contaminated or trapped in corners and revolving parts, and that it can be easily cleaned. In the pipeline industry weight metering of liquids, such as petroleum, is superior to volumetric metering because changes in density due, say, to trapped gases would not introduce weight flow error. Weight metering is advantageous for gaseous fuels because heating values vary with densities. Also, metering of gases must be done at very low pressure drops.

Other mass flowmeters that have obstruction-free flow passages are the rotating or oscillating gyroscopic meters of which several types are known. The gyroscopic meter has the disadvantage of requiring at least one and sometimes several loops with associated bends and turns between the flow inlet and outlet. For accurate flow measurement, moreover, the diameter of the loop must be ten to twenty or more times as large as the diameter of the flow passage (assuming circular cross-sections); and this requirement makes the apparatus large and cumbersome for the flow range. Because of the need for bends in the line, the gyroscopic meter is difficult to clean internally; and this constructional requirement makes the meter unsuitable where straight flow is required. In addition, the rotating gyroscopic type of meter requires rotating fluid seals, introducing serious leakage and friction problems.

Other known flowmeters that require no revolving parts, bends, or obstructions in the flow passage, namely, acoustical and electromagnetic meters, measure an average velocity, from which a volumetric flow rate is inferred. To obtain a mass flow indication, a separate density measurement and computation must be made.

One of the objects of this invention is to provide a meter for measuring the mass flow of fluids or of fluent solids or of mixtures of these.

Another object of this invention is to provide a meter with no revolving parts in contact with the flow.

A third object of this invention is to provide a meter with minimal obstruction in the flow path, whose resistance to flow can be made substantially that of a straight tube of the same cross-section as the flow passage.

A further object of this invention is to provide a meter with a flow sensor for rapidly measuring high rates of flow.

The mass flow measuring principle used in this invention is that where an oscillatory motion is applied by a member to a bounded stream of material orthogonally to the axis of flow, mechanical energy is added to the stream at a rate directly proportional to the mass rate of flow. If a hollow member, through which there is a unidirectional flow of fluid, be moved in translation in a direction orthogonal to the rectilinear flow axis, it experiences a periodic transverse force and adds a periodic transverse momentum to the effluent fluid, both in phase with the transverse velocity of the hollow member. The energy transfer, hence mass flow rate, is determined by measuring the transverse momentum of the fluid leaving the vibrating member, for example, by use of an additional downstream hollow member, itself transversely vibrated by the force of the effluent fluid.

The structure used to apply this principle includes a pair of conduits with straight bores arranged in tandem relation within a closed housing to provide a continuous passageway for matter flowing in a line. The upstream conduit is vibrated differentially with respect to the downstream conduit in a direction transverse to the line of flow by a separate vibrating means. The upstream conduit vibrates the matter flowing through it and imparts an alternating transverse momentum to the flowing matter. Change of transverse momentum of the matter flowing through the downstream conduit imparts a transverse vibratory force to the downstream conduit. Separate sensing means are used to detect this change in transverse momentum and to provide an output linearly rated to mass flow. It is to be noted that differential motion is required between the upstream and downstream conduits in order for the flowing matter to experience a change of transverse momentum in flowing from the upstream to the downstream conduit and thus imparting a vibratory force to the downstream member.

In the present specification, the term "vibration" is used to describe any type of mechanical oscillation, not necessarily requiring mechanical compliance. Similarly, for the sake of convenience, all fluent materials will be termed "fluids"; but it is to be understood that the term refers to solids, liquids or gases capable of undergoing a change of transverse momentum when passing through the oscillating member.

Various specific features and advantages of the invention are described hereinafter in connection with the following drawings.

Figure 1:
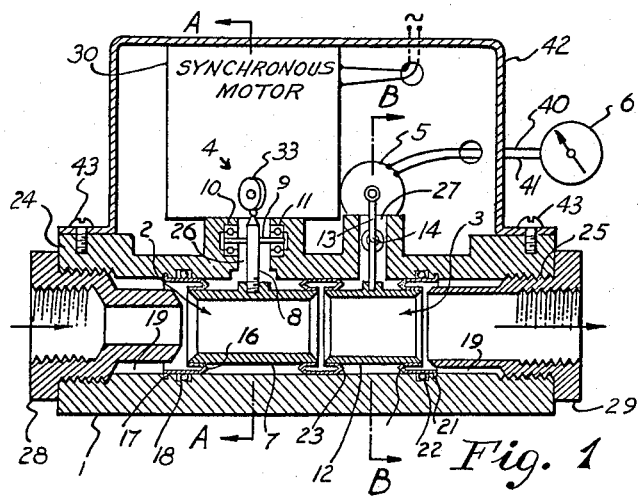
FIG. 1 is a schematic view showing a preferred form of the invention.
Figure 2:
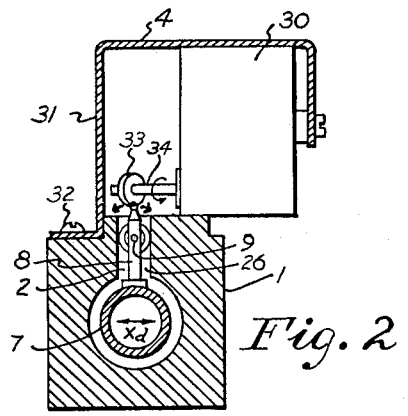
FIG. 2 is a sectional view of the vibratory flow sensing element of FIG. 1 along the line A—A, FIG. 1.
Figure 3:
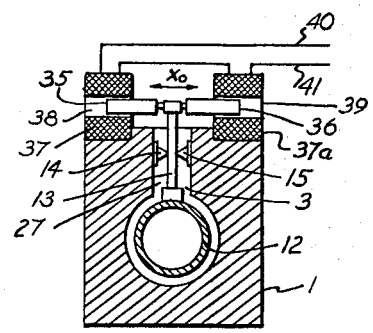
FIG. 3 is a sectional view of the vibratory flow sensing element of FIG. 1 along line B—B, FIG. 1.

The flowmeter consists of a housing 1, a flow vibrating tube assembly 2, a flow momentum sensing tube assembly 3, a vibration driving motor assembly 4, a momentum sensing tube motion pickup 5, a flow rate indicating voltmeter 6 and several miscellaneous elements. The vibrating tube assembly 2 consists of a flow tube 7 suspended by a connecting rod 8 from a shaft 9 mounted on two ball bearings 10 and 11. The top end of rod 9 is reduced in area and rounded to serve as a cam follower. The momentum sensing assembly 3 consists of a flow tube 12 suspended by a rod 13 from jewelled bearings 14 and 15. The inlet end of tube 7 is attached to an annular cup spring 16 which is held in place by snap ring 17 and sealed by O-ring 18 in the wall of cavity 19 in housing 1. The outlet end of tube 12 is similarly attached to annular cup spring 20 which is held in place by snap ring 21 and sealed by O-ring 22 in the wall of cavity 19 in housing 1. Double-sided annular spring 23 is connected to the downstream end of tube 7 and the upstream end of tube 12. At its center cross-section, spring 23 presses against the wall of cavity 19 in housing 1 so as to prevent transmission of motion from tube 7 to tube 12 through the spring. At its left end cavity 19 connects with threaded inlet port 24. At its right end cavity 19 connects with threaded outlet port 25. Passage 26 provides access to cavity 19 for rod 8. Passage 27 provides access to cavity 19 for rod 13. Inlet fitting 28 is threaded into inlet port 24. Outlet fitting 29 is threaded into outlet port 25. The diameter of flow passages in fitting 28, flow tube 7, flow tube 12 and outlet fitting 29 are progressively increased in that order to prevent interference with flow due to displacement of the movable flow tubes. The driving motor assembly 4 consists of a synchronous motor 30, mounted on a bracket 31 which is fastened to housing 1 with screws 32. A double acting wobble plate cam 33 is fastened to shaft 34 of motor 30. The cam engages the top end of rod 8 and imparts a periodic oscillation in the direction $X_d$, FIG. 2, to flow tube 7 at a frequency proportional to the synchronous speed of motor 30, hence line frequency. The momentum sensing tube motion pickup 5 consists of magnets 35 and 36 attached to opposite sides of rod 13 and free to move respectively in direction $X_o$, within center holes 38 and 39 of split coil 37 and 37a. Motion of magnets 35 and 36 induces a voltage in split coil 37 and 37a proportional to the transverse velocity of flow tube 12. This voltage is led to the flow rate indicating A.C. voltmeter 6 through leads 40 and 41. Protective dust cover 42 is attached to housing 1 with screws 43.

The relative weights of magnets 35 and 36 of fluid filled tube 12 and moment arms of rod 13 are so selected that the inertias on both sides of bearings 14 and 15 are balanced. The momentum sensing assembly 3 is thus made insensitive to linear accelerations transmitted through the housing. Annular springs 20 and 23 not only serve as fluid seals but also supply compliance to assembly 3 and center the flow tube 12.

The transverse momentum force applied to the moving fluid by flow tube 7 is expressed by the following equation:

$$P_d = P_d \sin \omega t = M X_d \omega \sin \omega t$$

If the natural frequency of the momentum sensing assembly 3 is several times greater than the excitation frequency the reaction of the momentum sensing assembly will be characterized by its compliance; and the displacement:

$$x_o = X_o \sin \omega t = \frac{M}{K_o}(X_d - X_o) \sin \omega t$$

where $K_o$ is the spring rate of the momentum sensing assembly. The value of the displacement of flow tube will ordinarily have an order of magnitude less than that of flow tube and can be ignored for the purposes of this description.

Therefore $$x_o = \frac{M}{K_o} X_d \sin \omega t$$

and the output voltage $$e_o = \frac{C_o}{K_o} M X_d \omega \sin \omega t$$

For a constant frequency, $\omega$ and a constant displacement $X_d$ of the vibrating flow tube 7, the output voltage is an alternating voltage at excitation frequency with an amplitude proportional to mass flow rate. Hence, the indication on voltmeter 6 is directly proportional to mass flow rate.

Figure 4:
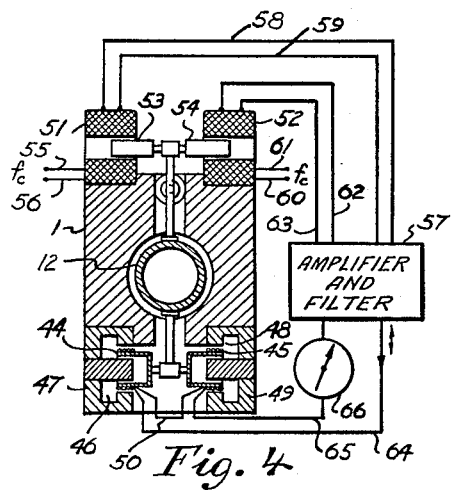
FIG. 4 is a schematic diagram of a force-feedback system used with the vibratory flow sensing element of FIG. 1.

FIGURE 4 shows a variation of the momentum sensing assembly where the system restoring force is mainly supplied by an electromagnetic structure rather than the annular springs. Here the sensing flow tube 12 is connected at the lower end to two coils 44 and 45. Coil 44 is located in air gap 46 in the field of permanent magnet 47. Coil 45 is located in air gap 48 in the field of permanent magnet 49. The two coils are connected electrically in series through lead 50 so that the same current passes through each coil causing a force in the same direction. The sensing tube motion pickup consists of two oppositely wound linear variable transformers 51 and 52, in place of split coil 37 and 37a and two opposite magnetic cores 53 and 54 in place of permanent magnets 35 and 36. The primary of transformer 51 is excited at carrier frequency $f_c$, through leads 55 and 56. The output of the secondary winding of transformer 51 is fed to amplifier 57 through leads 58 and 59. The primary of transformer 52 is excited at carrier frequency $f_c$ through leads 60 and 61. The output of the secondary winding of transformer 52 is fed to amplifier 57 through leads 62 and 63. The outputs of transformers 51 and 52 are compared in amplifier 57 and any unbalance voltage is passed through a carrier filter and causes a proportional current $i_o$ at vibration frequency to be passed through leads 64 and 65 to coils 44 and 45. With a high gain amplifier the displacement $X_o$ of flow tube 12 can be made negligible and the magnitude $I_o$ of alternating current $i_o$ will be directly proportional to transverse force applied by the fluid stream, hence to mass flow rate. This current is indicated by ammeter 66 which is calibrated directly in units of mass flow rate.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for metering the mass of matter flowing in a line, including a closed housing in a portion of the line with rigid inlet and outlet ports arranged in coaxial and axially spaced relation, a pair of conduits in the chamber arranged in tandem relation with straight bores providing a continuous passageway for the matter flowing in the line between the ports, means for vibrating the upstream conduit differentially with respect to the downstream conduit so as to vibrate the matter flowing through the upstream conduit in a transverse direction to the line of flow and to impart an alternating transverse momentum to the matter flowing through the upstream conduit, and output means for sensing the reaction of the downstream conduit to the transverse momentum of the flowing matter.

2. Metering means of the character claimed in claim 1 in which the conduits are tubes, and the vibrating means include a movable part connected to the upstream tube.

3. Metering means of the character claimed in claim 1 including sealing means for sealing the flow line between the upstream port and the upstream conduit, sealing means for sealing the flow line between the upstream and downstream conduits, and sealing means for sealing the flow line between the downstream port and the downstream conduit.

4. Metering means of the character claimed in claim 1 in which the upstream conduit is longer than the downstream conduit.

5. Metering means of the character claimed in claim 1 in which the downstream conduit is pivoted in the chamber with respect to the housing and is counterbalanced.

6. Metering means of the character claimed in claim 1 in which the output means includes a force sensor with a voltage output.

7. Metering means of the character claimed in claim 1 in which the output means includes a force feed-back circuit.

8. Metering means of the character claimed in claim 1 in which the downstream conduit is part of an assembly with a natural frequency higher than the frequency of vibration of the upstream conduit.

9. In a meter for measuring the mass of matter flowing in a line, a member in a portion of the line with rigid inlet and outlet ports arranged in coaxial and axially spaced relation, a vibratable pair of tubes arranged in tandem relation with straight bores to provide a continuous passageway for the matter flowing between the ports of the member, a sealing member between the upstream tube and inlet port, a sealing member between the upstream and downstream tubes, and a sealing member between the downstream tube and outlet port means for vibrating the upstream tube in transverse relation to the matter flowing in the line, and a sensor for measuring the reaction of the downstream tube to the transverse vibrations of the flowing matter.

References Cited by the Examiner

UNITED STATES PATENTS 2,349,016   5/1944   Stephens _____ 138—120 X

RICHARD C. QUEISSER, *Primary Examiner.*

E. D. GILHOOLY, *Assistant Examiner.*